(12) United States Patent
Santoni

(10) Patent No.: US 11,826,969 B2
(45) Date of Patent: Nov. 28, 2023

(54) DIAPHRAGM FORMING

(71) Applicant: McLaren Automotive Limited, Woking (GB)

(72) Inventor: Claudio Santoni, Woking (GB)

(73) Assignee: McLaren Automotive Limited, Woking (GB)

( * ) Notice: Subject to any disclaimer, the term of this patent is extended or adjusted under 35 U.S.C. 154(b) by 400 days.

(21) Appl. No.: 17/042,761

(22) PCT Filed: Mar. 29, 2019

(86) PCT No.: PCT/GB2019/050909
§ 371 (c)(1),
(2) Date: Sep. 28, 2020

(87) PCT Pub. No.: WO2019/186185
PCT Pub. Date: Oct. 3, 2019

(65) Prior Publication Data
US 2021/0023799 A1   Jan. 28, 2021

(30) Foreign Application Priority Data
Mar. 29, 2018 (GB) ..................... 1805320

(51) Int. Cl.
*B29C 70/44* (2006.01)
*B29C 51/10* (2006.01)
(Continued)

(52) U.S. Cl.
CPC ............. *B29C 70/44* (2013.01); *B29C 51/10* (2013.01); *B29C 70/542* (2013.01); *B29L 2031/3055* (2013.01)

(58) Field of Classification Search
CPC ...... B29C 70/544; B29C 70/542; B29C 70/44
See application file for complete search history.

(56) References Cited

U.S. PATENT DOCUMENTS 4,608,220 A    8/1986  Caldwell et al.
4,649,640 A *  3/1987  Ito ..................... H01F 41/127
                                               427/116
(Continued)

FOREIGN PATENT DOCUMENTS

AU    8086598        3/1999
AU    738 958 B2    10/2001
(Continued)

OTHER PUBLICATIONS

Notification of Transmittal of the International Search Report and the Written Opinion of the International Searching Authority, or the Declaration issued in corresponding International Application No. PCT/GB/2019/050909, dated Jun. 6, 2019, 16 pages.
(Continued)

*Primary Examiner* — Matthew J Daniels
(74) *Attorney, Agent, or Firm* — Fish & Richardson P.C.

(57) ABSTRACT

A method of forming a fibre article, comprising: providing a former having a contoured forming surface; locating a fibre preform between a first diaphragm and a second diaphragm, the second diaphragm being offset from the forming surface; drawing a vacuum between the first and second diaphragms so as to hold the preform captive between the diaphragms; displacing the diaphragms relative to the former so as to bring a part of the second diaphragm adjoining the preform into partial conformity with the former; drawing a vacuum between the second diaphragm and the former so as to increase the conformity between the said part of the second diaphragm and the former; and setting the preform in its configuration.

18 Claims, 5 Drawing Sheets

(51) Int. Cl.
B29C 70/54 (2006.01)
B29L 31/30 (2006.01)

(56) References Cited

U.S. PATENT DOCUMENTS

| | | | | |
|---|---|---|---|---|
| 4,695,344 A * | 9/1987 | Crane | ................... | B29C 70/44 |
| | | | | 156/289 |
| 4,943,222 A * | 7/1990 | Nathoo | ................... | B28B 7/12 |
| | | | | 425/395 |
| 5,108,532 A * | 4/1992 | Thein | ................. | B32B 37/1009 |
| | | | | 156/308.2 |
| 5,151,277 A * | 9/1992 | Bernardon | ........... | B29C 70/443 |
| | | | | 249/161 |
| 5,156,795 A * | 10/1992 | Harvey | ................ | B29C 70/542 |
| | | | | 264/510 |
| 5,322,665 A * | 6/1994 | Bernardon | ............. | B29C 70/44 |
| | | | | 264/316 |
| 8,999,216 B2 * | 4/2015 | Lind | ...................... | B29C 70/48 |
| | | | | 264/258 |
| 9,770,874 B2 * | 9/2017 | Häffelin | ............... | B29C 70/542 |
| 10,016,949 B2 * | 7/2018 | Pridie | ................. | B29C 43/3642 |
| 11,518,118 B2 * | 12/2022 | Wybrow | ............... | B29C 70/345 |
| 2002/0029842 A1 * | 3/2002 | Nishida | .................. | B29C 43/48 |
| | | | | 156/499 |
| 2005/0255770 A1 * | 11/2005 | Crump | .................... | B29C 70/44 |
| | | | | 442/104 |
| 2009/0091052 A1 * | 4/2009 | Pridie | .................... | B29C 70/54 |
| | | | | 425/149 |
| 2009/0295015 A1 * | 12/2009 | Kuntz | .................... | B29C 33/38 |
| | | | | 264/263 |
| 2010/0269978 A1 * | 10/2010 | Marengo | ............ | B29C 67/0037 |
| | | | | 156/212 |
| 2011/0014315 A1 * | 1/2011 | Okoli | ................... | B29C 70/086 |
| | | | | 425/129.1 |
| 2011/0254207 A1 * | 10/2011 | Hallander | ............... | B29C 70/44 |
| | | | | 264/553 |
| 2014/0175709 A1 * | 6/2014 | Blackburn | .............. | B29B 11/16 |
| | | | | 264/554 |
| 2019/0016063 A1 * | 1/2019 | Newton | .................. | B29C 70/44 |

FOREIGN PATENT DOCUMENTS

| | | |
|---|---|---|
| DE | 202016104449 | 8/2016 |
| EP | 0017452 | 10/1980 |
| GB | 2452298 | 3/2009 |
| JP | S56-157314 A | 12/1981 |
| JP | H10-156935 | 6/1998 |
| WO | WO 02/02299 | 1/2002 |

OTHER PUBLICATIONS

Search Report under Section 17(5), issued in related Application No. GB1805320.7 dated Sep. 21, 2018, 3 pages.
Examination Report under Section 18(3) issued in related Application No. GB1904377.7 dated Jun. 17, 2020, 3 pages.
Combined Search and Examination Report under Sections 17 and 18(3), issued in related Application No. GB1904377.7, dated Sep. 20, 2019, 6 pages.
CN Office Action in Chinese Appln. No. 20198035589, dated Mar. 23, 2022, 16 pages (with Machine Translation).
GB Examination Report under Section 17 issued in British Application No. GB1904377.7 dated Jun. 16, 2020, 1 page.
International Preliminary Report on Patentability in International Appln. No. PCT/GB/2019/050909, dated Oct. 8, 2020, 9 pages.

* cited by examiner

DIAPHRAGM FORMING

CROSS-REFERENCE TO RELATED APPLICATIONS

The present application is the national stage entry of International Patent Application NO. PCT/GB2019/050909, filed on Mar. 29, 2019, and claims priority to Application No. GB 1805320.7, filed in the United Kingdom on Mar. 29, 2018, the disclosures of which are expressly incorporated herein in its entirety by reference thereto.

This invention relates to moulding components, especially composite components.

An increasing number of relatively large components are being made by moulding. Many of these are composite components, typically fibre-reinforced resin components made of systems such as carbon-fibre/epoxy. Some examples are tubs for automobiles, wings for aircraft, blades for wind turbines and masts for yachts.

One method for forming moulded components is diaphragm forming. In diaphragm forming, a flexible moulding blank which is to be shaped is positioned between an elastic diaphragm and a shaped, rigid mould tool. Then a vacuum is drawn between the diaphragm and the mould tool. This pulls the diaphragm into contact with the mould, and eventually causes the blank to be held in close conformity with the shape of the mould tool. Then the blank can be set in shape, for example by applying heat to the mould tool so as to cure a resin that is infused into the blank. Once the blank is set in shape the vacuum can be released and the blank can be removed. It is possible to position a diaphragm on either side of the mould blank, and to additionally draw a vacuum between the two diaphragms. This allows the blank to be laid up conveniently on top of the lower diaphragm.

FIG. 1 shows steps in one type of diaphragm forming process. At FIG. 1a, a mat 1 of reinforcing fibres impregnated with a heat-activated adhesive is located between two diaphragms 2, 3. A shaped former 4 is located under the diaphragms. The mat 1 is positioned so that it is directly above the former. (See FIG. 1a). A vacuum is drawn between the diaphragms to consolidate the mat 1 and hold it tight between the diaphragms. (See FIG. 1b). Then a vacuum is drawn in the region between the lower diaphragm 3 and the former. This causes the diaphragms and hence the mat to conform to the former. (See FIG. 1c). The mat is heated to cause it to set in the shape of the former's surface. Then the vacuums can be released and the shaped mat removed. This process can be used to make fibre preforms for use in a subsequent resin transfer moulding step.

This process has several potential difficulties. Because the diaphragms are elastic it is difficult to achieve precise control over the positional relationship between the diaphragms and the mould tool when the they come into contact. This is typically not significant for low performance parts, because if the moulding blank is homogeneous then some margin can be provided on the moulding blank and the excess can be cut off after forming. However, high performance parts are often made by combining varied materials, with specific materials being required at particular points on the ultimate product. For example, they can be made by laying up different types of carbon fibre mat, with specific types of mat located and/or oriented specifically relative to each other and the mould.

It would be desirable to have an improved method for double diaphragm forming.

According to one aspect there is provided a method of forming a fibre article, comprising: providing a former having a contoured forming surface; locating a fibre preform between a first diaphragm and a second diaphragm, the second diaphragm being offset from the forming surface; drawing a vacuum between the first and second diaphragms so as to hold the preform captive between the diaphragms; displacing the diaphragms relative to the former so as to bring a part of the second diaphragm adjoining the preform into partial conformity with the former; drawing a vacuum between the second diaphragm and the former so as to increase the conformity between the said part of the second diaphragm and the former; and setting the preform in its configuration.

According to a second aspect there is provided a method of forming a fibre article, comprising: providing a former having a contoured forming surface; locating a fibre preform between a first diaphragm and a second diaphragm, the second diaphragm being offset from the forming surface; drawing a vacuum between the first and second diaphragms so as to hold the preform captive between the diaphragms; mechanically displacing the diaphragms relative to the former so as to bring a part of the second diaphragm adjoining the preform into partial conformity with the former, during the said displacing step the former is located above the second diaphragm; drawing a vacuum between the second diaphragm and the former so as to increase the conformity between the said part of the second diaphragm and the former; and setting the preform in its configuration.

According to a third aspect there is provided a method of forming a fibre article, comprising: providing a former having a contoured forming surface; locating a fibre preform between a first diaphragm and a second diaphragm, the second diaphragm being offset from the forming surface, the preform comprising a heat-activatable binder; when the preform is in contact with at least the first diaphragm applying heat to the preform by positioning a first heater unit so as to be located between the former and the one of the first and second diaphragms closest to the former and using the first heater unit to apply heat to the preform; drawing a vacuum between the first and second diaphragms so as to hold the preform captive between the diaphragms; mechanically displacing the diaphragms relative to the former so as to bring a part of the second diaphragm adjoining the preform into partial conformity with the former; ceasing to apply heat to the preform prior to the said displacing step by removing the first heater unit from between the former and the one of the first and second diaphragm closest to the former; drawing a vacuum between the second diaphragm and the former so as to increase the conformity between the said part of the second diaphragm and the former; and setting the preform in its configuration.

During a particular forming operation the diaphragms may be brought into initial contact through mechanical movement of the diaphragms relative to the former. The said displacing step by be done mechanically. Alternatively, they may be brought into initial contact through the drawing of a vacuum between the former and the diaphragm closer to it. This may be facilitated by the provision of an airtight chamber surrounding the sides of the former and having the closer diaphragm as one of its walls.

At the said locating step the first diaphragm is offset from the forming surface.

The first and/or second diaphragms may be supported by a respective frame, e.g. around its periphery. The step of mechanically displacing the diaphragms may comprise displacing the frame relative to the former.

During the said displacing step the former may be located above the second diaphragm.

The step of displacing the diaphragms may comprise moving the diaphragms upwards relative to the former.

The second diaphragm may overlie the first diaphragm. The second diaphragm may be an upper diaphragm and the first diaphragm may be a lower diaphragm. The first diaphragm may overlie the second diaphragm. The first diaphragm may be an upper diaphragm and the second diaphragm may be a lower diaphragm.

The method may comprise storing a plurality of formers in a storage zone located above the second diaphragm and, prior to the step of displacing, automatically moving a predetermined one of the said formers to an operative position over the second diaphragm. The said automatic motion may be performed by a robot manipulator.

The method may comprise providing a mechanism for moving the first diaphragm laterally; locating the fibre preform on the first diaphragm at a first station; laterally moving the first diaphragm carrying the fibre preform to a second station; and performing the said displacing step with the first diaphragm located at the second station.

The precursor may comprise a heat-activatable binder. The method may comprise: when the precursor is in contact with at least the first diaphragm applying heat to the precursor; and ceasing to apply heat to the precursor prior to the said displacing step.

The method may comprise permitting the binder to cool and thereby set the precursor in shape.

The preform may comprise a heat-activatable binder. The method may comprise: when the preform is in contact with at least the first diaphragm applying heat to the preform; and ceasing to apply heat to the preform prior to the said displacing step. The method may comprise permitting the binder to cool and thereby set the preform in shape.

The step of applying heat to the preform may comprise positioning a first heater unit so as to be located between the former and the one of the first and second diaphragms closest to the former, and using the first heater unit to apply heat to the preform; and the step of ceasing to apply heat to the preform may comprise removing the first heater unit from between the former and the one of the first and second diaphragm closest to the former.

The method may comprise: tensioning the first diaphragm; and locating the fibre preform on the first diaphragm whilst the first diaphragm is under tension.

The first diaphragm may be maintained under tension until the vacuum has been drawn between the first and second diaphragms.

The step of tensioning the first diaphragm may comprise pressing an object into the first diaphragm.

The fibre preform may comprise multiple sheets of fibre material laminated into a stack. The or each sheet of fibre material may be a sheet of woven fibre material.

The diaphragms may be elastic. They may be or comprise elastic membranes.

The preform may be part of a structural part of a vehicle. The preform is part of a structural part of an automobile and the structural part is an automobile tub.

According to a fourth aspect there is provided a double diaphragm forming apparatus comprising: a former having a contoured forming surface; a first diaphragm and a second diaphragm, the second diaphragm being offset from the forming surface; a vacuum pump for drawing a vacuum between the first and second diaphragms so as to hold a preform captive between the diaphragms; a drive mechanism for mechanically displacing the diaphragms relative to the former so as to bring a part of the second diaphragm adjoining the preform into partial conformity with the former; and a second vacuum pump for drawing a vacuum between the second diaphragm and the former so as to increase the conformity between the said part of the second diaphragm and the former.

According to a fifth aspect there is provided a double diaphragm forming apparatus comprising: a former having a contoured forming surface; a first diaphragm and a second diaphragm, the second diaphragm being offset from the forming surface, the former being located above the second diaphragm; a vacuum pump for drawing a vacuum between the first and second diaphragms so as to hold a preform captive between the diaphragms; a drive mechanism for mechanically displacing the diaphragms relative to the former so as to bring a part of the second diaphragm adjoining the preform into partial conformity with the former; and a second vacuum pump for drawing a vacuum between the second diaphragm and the former so as to increase the conformity between the said part of the second diaphragm and the former.

The present invention will now be described by way of example with reference to the accompanying drawings. In the drawings.

Figure 1A:
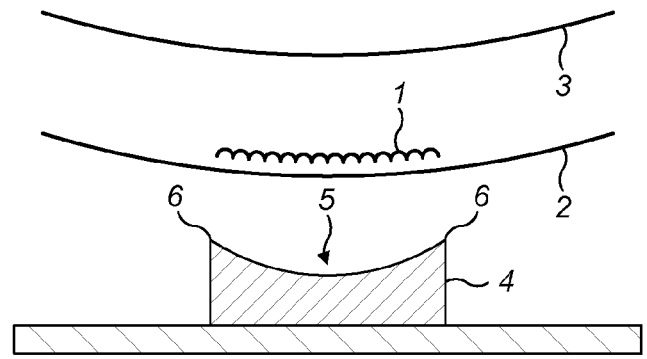
FIG. 1 shows stages in a diaphragm forming process.
Figure 1B:
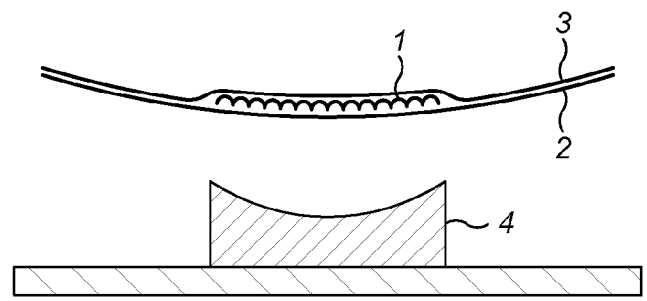
Figure 1C:
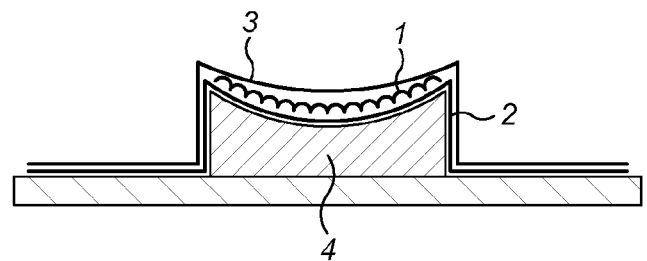
Figure 2:
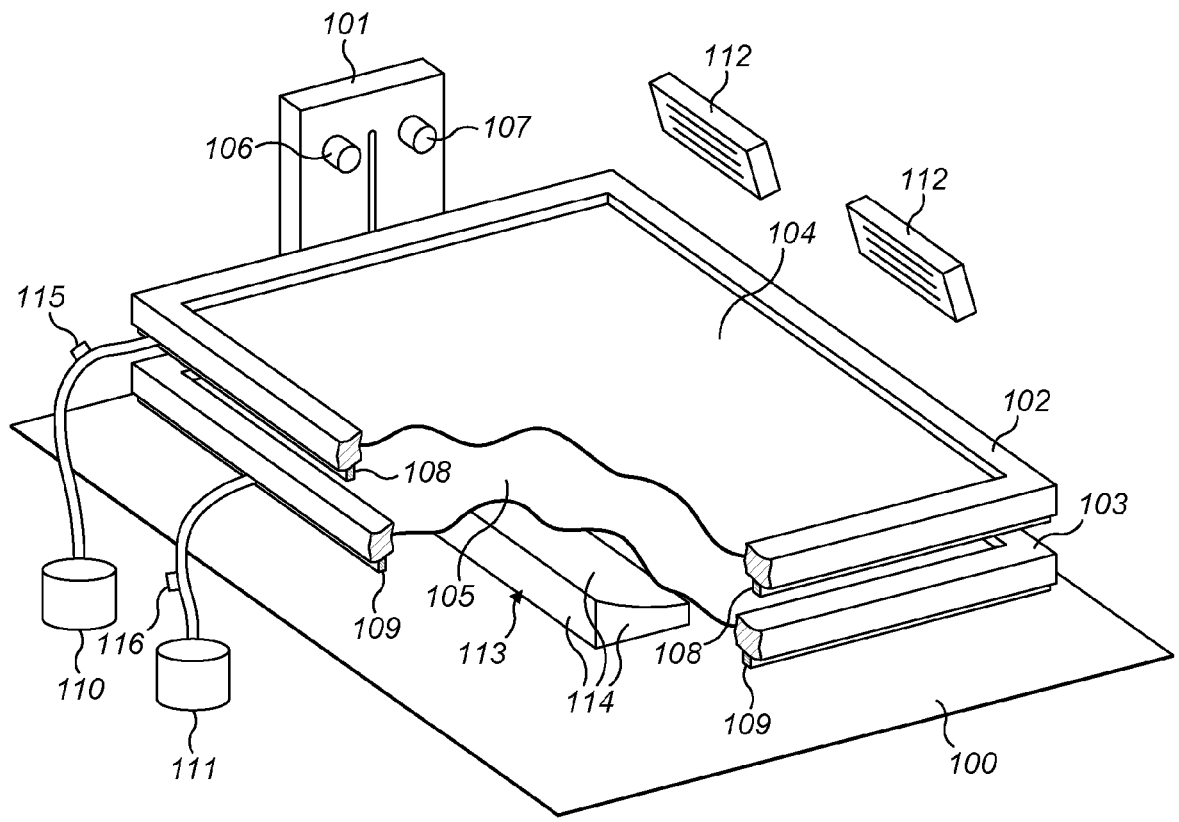
FIG. 2 shows a diaphragm forming apparatus.

FIG. 2 is a cut-away view of a diaphragm forming apparatus. The apparatus comprises a base 100. In this example the base is a horizontal generally flat surface, but it could be in any orientation and could be non-flat. A support tower 101 extends away from the base. FIG. 2 shows a single support tower but there could be multiple towers or support mechanisms of other forms as required for stability. The support tower 101 supports a pair of frames 102, 103. Each frame is a rigid structure defining an opening within it. The frames are generally planar and are arranged so that they are generally parallel to the base 100. Diaphragms 104, 105 are attached to respective ones of the frames so as to close the opening in the respective frame. Each diaphragm is attached in an air-tight way around its periphery to the respective frame. The diaphragms are formed of flexible and optionally elastic sheet material. The frames are mounted on the support tower 101 so that they can be moved towards and away from the base 100 by means of motors 106, 107. A seal 108 is provided on one or both of the frames so that when the frames are moved so as to abut each other the volume between the diaphragms can be sealed in an air-tight manner. A seal 109 is provided on frame 103 and/or on base 100 so that when frame 103 is moved so as to abut the base the volume between the base and the diaphragm 105 carried by frame 103 can be sealed in an air-tight manner. The seals could be located in any suitable way. A first vacuum pump 110 is coupled to one of the frames through an opening which, when the frames are abutting each other, gives access to the volume between the diaphragms. A second vacuum pump 111 is coupled to one of the frames or to the base through an opening which, when the frame 103 is abutting the base, gives access to the volume between diaphragm 105 and the base. Heaters 112 are arranged to play on the upper diaphragm. Heaters could be provided that can play on the lower diaphragm. They could be removable from the space between the closer diaphragm 105 to the base 100 and the base itself to permit the closer diaphragm to be moved to meet the base. A former 113 is located on the base.

The diaphragms are formed of a pliable sheet material. One or both of the diaphragms may be formed of an elastic material. The diaphragms may, for example, both be formed of elastomeric sheet, for example rubber or silicone sheet. The diaphragms may be of any suitable thickness, for example a thickness in the range from 0.5 to 2.0 mm. Each diaphragm may be held taut in its respective frame. Alternatively, each diaphragm may be held loosely in its frame. As a consequence it may sag somewhat at the outset of the forming process.

The base or bed 100 is generally flat. Optionally, grooves may be provided in the bed or scrim may be laid across the bed to improve the drawing of a vacuum uniformly across the bed and the former. Pump 111 could draw its vacuum through orifices in the bed.

In operation, a precursor, which may be a mat of reinforcing material impregnated with a heat activated adhesive, can be placed between the diaphragms. Then the diaphragms can be moved together by using motor 106 and/or motor 107 to reposition one or both of the frames. Then a vacuum is drawn between the diaphragms by using pump 110. Then the diaphragms can be moved in unison by using motors 106 and 107 so as to bring frame 103 into a position where it abuts the base 100. The vacuum between the frames is maintained. This pushes diaphragm 105 into partial conformity with the exposed surface 114 of the former 113. The precursor is located at a region of the diaphragms such that it too is forced to take up the shape of the former. Because the preform is held to diaphragm 105 by diaphragm 104, the preform is also partially conformed to the exposed surface 114. Then a vacuum is drawn between diaphragm 105 and the base 100. This brings diaphragm 105 into full conformity with the exposed surface 114. At some point up to this stage the precursor has been heated by heaters 112 in order to activate the adhesive. Then the adhesive is permitted to set, fixing the precursor in a shape mimicking that of at least part of the exposed surface 114 of the former. Then the vacuums are released by activating valves 115, 116 in the supply lines from pumps 110, 111, the frames are moved apart and the part formed from the precursor is removed.

Figure 3:
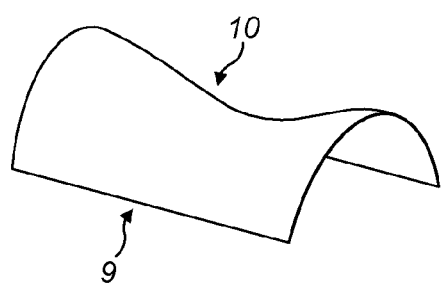
FIG. 3 shows a part to be formed.

FIG. 3 shows a part 9 that may be desired to be formed using this method. The part has a saddle region 10 which is concave upwards in the orientation of FIG. 3. The part may go on to form a structural part of a vehicle (e.g. an automobile tub, an aircraft wing or a boat hull) or a part for another purpose such as a blade for a wind turbine. Advantageously, the part forms part of a structural part of a high performance automobile.

Figure 4:
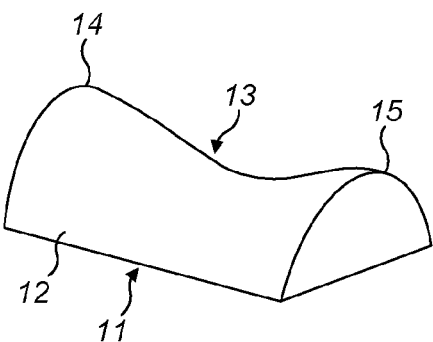
FIG. 4 shows a former for shaping the part of FIG. 3.

FIG. 4 shows a former or tool 11 suitable for forming the part of FIG. 3 in a diaphragm forming process. The former is a rigid block or shell having a forming surface 12. The forming surface has a shape that matches the desired shape of part 9. The forming surface has a saddle region 13 which is concave upwards in the orientation of FIG. 3 and is intended to shape the saddle region 10 of the part 9. On either side of the saddle region 13 of the former there are prominences 14, 15.

FIG. 5 shows stages in the forming of the part 9 by a double-diaphragm process, using the apparatus of FIG. 2.

In a first step (FIG. 5a) the two diaphragms 104, 105 are spaced apart from each other and from the former 113. Each diaphragm is suspended from a respective frame 102, 103. The operating direction 120 in which the frames can be moved is generally perpendicular to the diaphragms, and the former 113 is positioned on bed 100 offset from the diaphragms in the operating direction. The former is located on the bed with its forming surface 114 facing the closer diaphragm 105. The prominences 14, 15 are both nearer to the closer diaphragm than is the hollow defined by the saddle region 13.

Figure 5A:
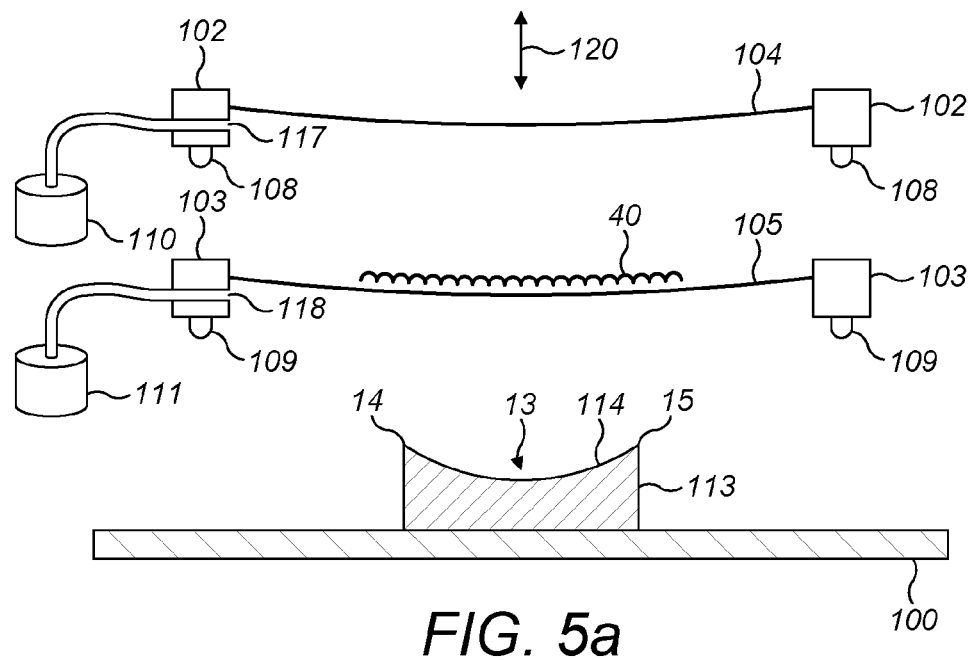
FIG. 5 shows, in cross-section, stages in a double-diaphragm process for shaping the part of FIG. 3.

As shown in FIG. 5a, a precursor 40 is located between the diaphragms. The precursor is formed of sheet material. It may comprise one or more layers of material. One or more such layers may, for example, be of woven or knitted fabric. One or more such layers may, for example, be of loose or bundled fibres, for example runs of fibre or tow. One or more such layers may, for example, be non-fibrous material, for example biaxially uniform sheet. A fabric layer may comprise runs of reinforcing fibre which are interwoven, stitched or fused together. Such stitching may be by means of a secondary fibre material having a lower tensile strength per unit volume than the material of the reinforcing fibre. The stitching fibre may nevertheless be substantially inextensible. The reinforcing fibre may, for example, be carbon fibre, glass fibre or a polymer fibre such as an aramid fibre. Layers of loose or bundled fibres may comprise fibres of one or more such materials. As an example, the precursor may comprise multiple sheets of carbon fibre fabric or mat. Each of those sheets may comprise carbon fibre runs in multiple non-parallel directions. For example, the runs in a single sheet may be offset at 90°, 60° or 45° to each other. The sheets may be arranged one on top of the other so that the run directions in one sheet are offset from the or each run direction in the or each adjacent sheet. When the precursor comprises multiple sheets they may be tacked together by adhesive or by mechanical bonding elements such as staples, studs, clips or stitches to help retain them in alignment with each other.

The precursor is pliable. This allows it to be forced to conform to the forming surface 114 of the former.

The precursor is configured so that it can be set in shape so as to adopt the shape of the forming surface. This may be done in any suitable way. For example, one or more layers of the precursor may comprise thermoplastic material. The precursor may then be heated (e.g. by heaters 112) before and/or whilst in contact with the former so as to raise the thermoplastic material above its softening temperature (e.g. for some materials the glass transition temperature), and then permitted to cool whilst in contact with the former so as to set the thermoplastic material in shape. Alternatively, one or more layers of the precursor may comprise a heat activated adhesive. The precursor may then be heated before and/or whilst in contact with the former so as to cause the adhesive to set the precursor in shape. Alternatively, one or more layers of the precursor may be of a plastically deformable material so that pulling the precursor against the former causes plastic deformation of the plastically deformable material. One convenient approach is for the precursor to comprise a layer of fabric comprising fibres, and for those fibres to be coated with a thermosetting adhesive. The precursor may comprise one or more sheets of dry fabric. The precursor may comprise a dry fibre binder which may be inherently tacky or may be heat-activatable (e.g. thermoplastic or thermosetting).

The precursor is located between the diaphragms at a location such that, when the diaphragms are moved to the former as will be described below, it will be located at the shaping surface 114. Consequently it can be pressed to the shape of the shaping surface 114.

If the diaphragms are generally horizontal then the precursor can be laid on the lower diaphragm, as shown in FIG. 5a. The precursor may be tacked to one of the diaphragms with a temporary adhesive. That may help hold it in place if the diaphragms are not horizontal.

As indicated above, in one example of the process, the diaphragms and the precursor are heated at this stage, e.g. by heaters 112. There may be additional heaters (not shown in FIG. 5*a*) between the closer diaphragm 105 and the former 113. They can be removed before the next step of the process. Heating the precursor at this stage can soften it if it is thermoplastic or can activate a heat-activated adhesive comprised in the precursor.

In a preferred configuration, the precursor comprises multiple sheets which are coated at least partially with a binder which can help to hold them together in a stack. The binder could be in powder or liquid form, or in the form of an adhesive sheet. In the process of laying up the sheets, at last some of the sheets may be coated on at least one side with the binder. Then, when the sheets are laid up there can be binder between the sheets. Preferably, the binder is disposed on the sheets such that the binder does not come into contact with the diaphragms. This can avoid degradation of the diaphragms.

Figure 6:
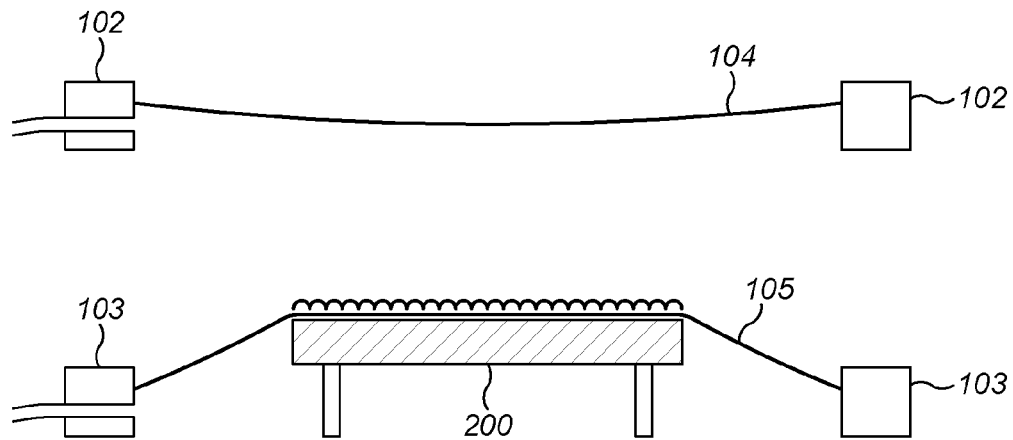
FIG. 6 shows the motion of heaters relative to diaphragms.

When the precursor is loaded into contact with a diaphragm—typically a lower diaphragm—it is convenient for that diaphragm to be in tension. It may be in tension in a single direction. Preferably it is in tension in two non-parallel directions. A convenient way to tension the diaphragm is to press a bearer into contact with the diaphragm so as to deform it into tension. For example, FIG. 6 shows an adaptation of step 5*a*. A bearer 200 has been pressed into the lower diaphragm 105 to bring it into tension at the time when the precursor 40 is loaded on to it. Conveniently, the bearer is pressed into the opposite side of the diaphragm from that on which the precursor is loaded. This can make it easier to load the precursor, and can make the subsequent positioning of the precursor against the mould 114 more accurate by counteracting sag in the diaphragm. The bearer may take the form of a flat table. The bearer may be removed before or after the subsequent step of drawing a vacuum between the diaphragms.

There is an outlet 117 through frame 102. Pump 110 is coupled to that outlet. Seal 108 can render the region between the diaphragms air-tight when the frames are positioned against each other, except for outlet 117. The seal 108 may, for example, be a rubber bead. Pump 110 could alternatively (or in addition) be coupled through frame 103 and/or could be attached to a connector in one of the diaphragms.

Figure 5B:
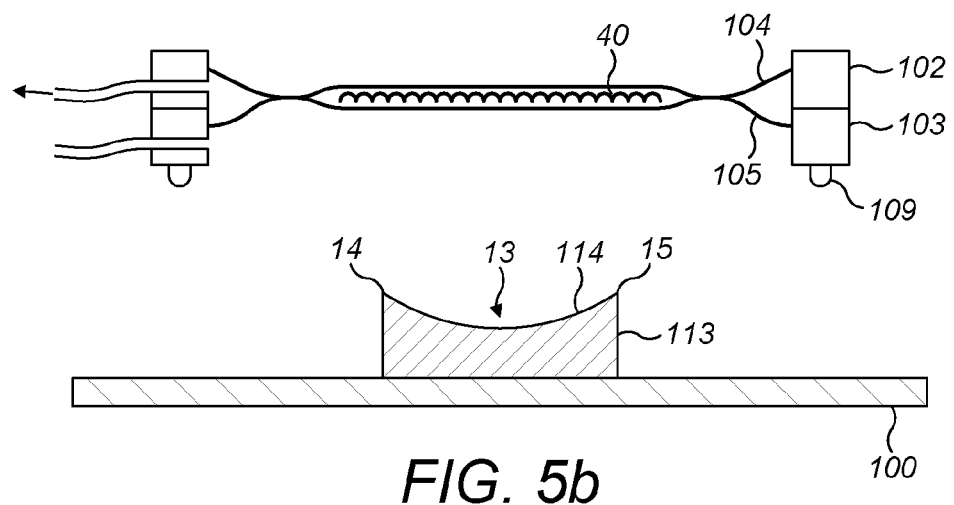
Figure 5C:
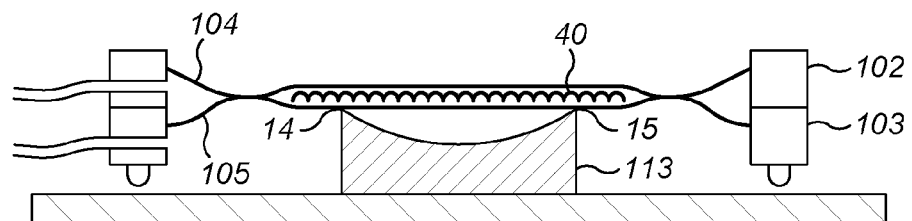

As shown in FIG. 5*b*, in the next step of the process the diaphragms 104, 105 are brought together by moving at least one of the frames so as to bring the frames into sealing engagement. Then a vacuum is drawn between the diaphragms by means of pump 110. This pulls the diaphragms together and holds the precursor securely captive between the diaphragms.

There is an outlet 118 through frame 103. Pump 111 is coupled to that outlet. Seal 109 can render the region between the closer diaphragm 105 and the bed 100 air-tight when the closer frame 103 is positioned against the bed, except for outlet 118. The seal 109 may, for example, be a rubber bead.

Figure 7:
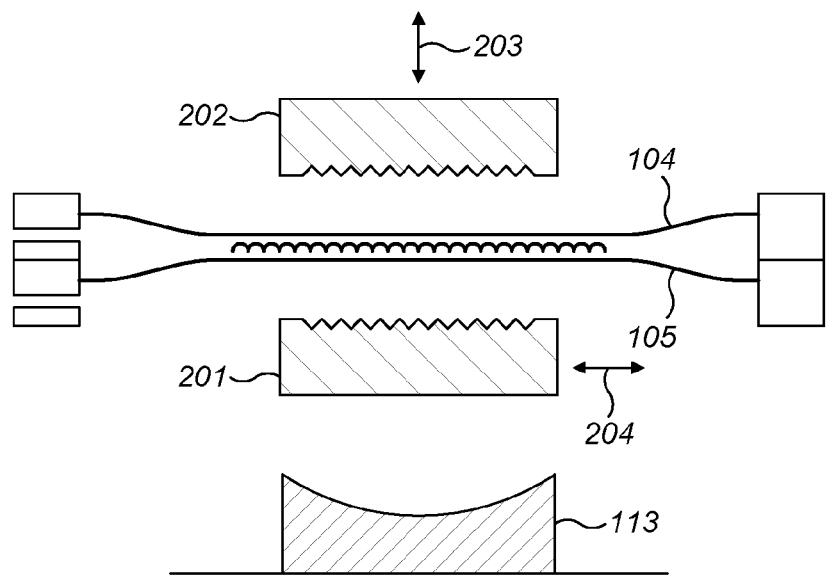
FIG. 7 shows how a diaphragm may be stretched.

Heat is applied to the diaphragms, for example using heaters 112 and optionally other heaters provided on the forming apparatus. Heat is transferred through the diaphragms to the precursor. This can activate the binder of the precursor. Typically the binder may become active in the region of 80° C. Preferably the precursor is heated to between 70° C. and 100° C. Preferably the precursor is heated such as to activate the binder. The time taken to heat the precursor can represent a bottleneck in some processes. To reduce this, it is preferred that the heaters are arranged as shown in FIG. 7. A lower heater unit 201 can be moved with a horizontal component (see 204) so as to be located between the lower diaphragm 105 and the mould tool 113. It can be removed before the moulding step. An upper heater unit 202 can be moved with a vertical component above the upper diaphragm 104. Because the upper heater unit can move vertically (see 203), it can apply heat continually to the upper diaphragm as the upper diaphragm is lowered into contact with the lower diaphragm. Thus, in a preferred process flow, with the diaphragms 104, 105 separated vertically, the precursor is loaded onto the lower diaphragm. Then the upper diaphragm is lowered into contact with the lower diaphragm whilst (i) the upper heater 202 is also lowered and (ii) the upper heater unit applies heating to the upper diaphragm. Preferably during the majority of the travel of the upper diaphragm between its position during the loading step and its position when it comes into contact with the lower diaphragm, the vertical distance between the upper diaphragm and the heater is less than 100 mm, more preferably less than 50 mm.

In one convenient version of the process, heat is applied to the precursor to bring it to a temperature that is such as to activate a component of the precursor. The component of the precursor is activated such that on subsequently cooling from that temperature it will at least partially rigidify the precursor. The heat is applied when the precursor is not held in conformity—which may be partial or full conformity—with the mould. Then the application of heat to the precursor, e.g. from one or more electrical heaters, is ceased or substantially ceased prior to the bringing of the precursor into partial or full conformity with the mould surface. A measure having the effect of cooling the precursor may be commenced after the precursor is fully in conformity with the mould. That may, for example, be forcing air to move past the precursor.

The vacuum may be drawn before or after the precursor is heated. In one convenient process, a first level of vacuum is drawn between the diaphragms whilst the precursor is being heated. Once the precursor has reached a predetermined temperature and/or state, e.g. with the binder activated, the heating can be stopped. Then a second, greater level of vacuum can be drawn. The second level of vacuum may, for example, be approximately 1 Bar below ambient pressure. The second level of vacuum may be drawn with the lower diaphragm in contact with the mould, as described further below. A lower heater 201 is withdrawn from the space between the lower diaphragm and the mould before the lower diaphragm is moved into contact with the mould.

Figure 5D:
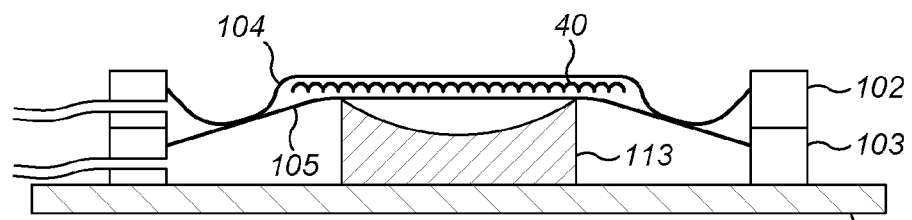

The frames 102, 103 are moved so as to bring the closer diaphragm 105 into contact with the forming surface 114. In this example, the mould surface has a concavity in at least one axis, as represented by the saddle. However, the mould surface could be flat or fully convex. In this example, the lower diaphragm 105 first contacts the prominences 14, 15. (See FIG. 5*c*). Then, as shown in FIG. 5*d*, the frames are moved so that the closer frame 103 to the bed is brought into sealing engagement with the bed. At this stage, although the periphery of the closer diaphragm 105 is closer to the bed in the operating direction 120 than is the deepest part of the saddle 13 of the forming surface 114, the closer diaphragm 105 is held away from the deepest part of the saddle by the prominences 14, 15. The frames may be moved by any suitable mechanism. For example, they may be driven to move by hydraulic actuators or electric motors to move. Guideways may be provided to guide the motion of the frames.

Figure 5E:
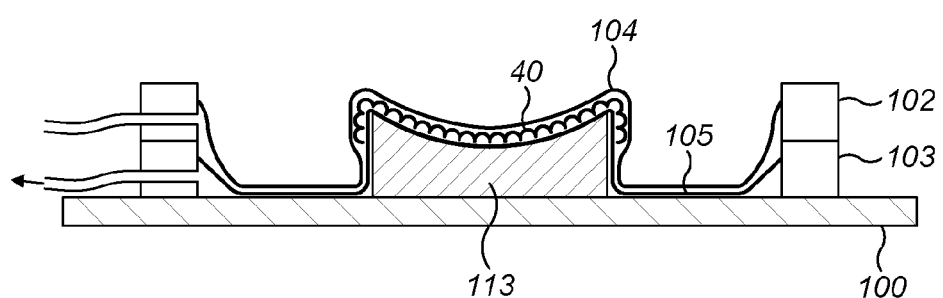

Next, using pump 111 a vacuum is drawn between the bed 100 and the closer diaphragm 105. (FIG. 5e). This pulls the closer diaphragm 105 into conformant uniform contact with the forming surface 114. The precursor 40 has been positioned so that it is adjacent to the region of the closer diaphragm 105 that is in contact with the forming surface 114. Because the precursor is held to the closer diaphragm by the vacuum between the two diaphragms, the precursor is also held in conformity with the shape of the forming surface 114. In the case of a concave or flat mould, this step may be omitted.

The precursor is then set in shape by appropriate means. For example, if the precursor is thermoplastic and has previously been heated then it is permitted to cool; or if the precursor comprises thermosetting adhesive then the precursor is heated (if not already heated); or if the precursor comprises ultra-violet activated adhesive then it is exposed to ultra-violet light. If the upper heater 202 (see FIG. 6) is movable relative to the upper diaphragm, it can usefully be switched off and/or moved away from the upper diaphragm whilst any thermosetting component of the precursor is cooling. This can increase the rate of cooling of the precursor and speed up the process. Fans may be arranged to play on the upper and/or lower diaphragm whilst the precursor is cooling. This can increase the rate of cooling.

Figure 5F:

Once the precursor has been set in shape the vacuums are released, the frames returned to the position shown in FIG. 5a and the set body is removed from the apparatus as shown at 40' in FIG. 5f.

Each diaphragm may be of uniform or non-uniform thickness. If the diaphragm is of non-uniform thickness, the effective thickness of the diaphragm may be taken to be its mean thickness.

The diaphragms may be of the same or different compositions. It is preferred that both diaphragms are elastically extensible. Both diaphragms may be elastomeric sheets, for example rubber or silicone sheets. Both diaphragms may be of material having a Young's modulus less than, for example, 10 MPa or less than 6 MPa or less than 3 MPa.

The or each vacuum may be drawn to an absolute pressure of, for example, 200 mb or less, or 100 mb or less, or 50 mb or less. The diaphragm closer to the former may be more elastic than the other diaphragm: i.e. it may be deform more for a given load.

The apparatus of FIG. 2 may be installed in any orientation. For example, the operating direction 120 could be vertical, horizontal or inclined. The former 113 could be below, above or offset horizontally from the diaphragms.

In the example of FIG. 5, the closer diaphragm is first moved into contact with the former by motion of the frames. Then it is drawn into full conformity with the former by drawing a vacuum between it and the former. In another example, the volume between the closer diaphragm and the bed 100 may be airtight even when the closer diaphragm is spaced from the former 113. This may be achieved by the presence of airtight walls extending from the bed to frame 103 when frame 103 is in the position shown in FIG. 5b. Then the closer diaphragm may be pulled into contact with the former by drawing a vacuum in that volume.

It will be noted that in the process escribed above, there is no need for a housing having upstanding walls extending between the diaphragm and the surface 100 that carries the mould body. A vacuum can be drawn between the mould body and the diaphragm closer to it after that diaphragm has been brought into sealing relationship with the mould body and/or the surface 100. The absence of such walls is convenient because it can make it easier to access the mould tool. The diaphragms may be moved mechanically into contact with the mould tool, as opposed to through the drawing of a vacuum between one or both of them and the mould tool.

The diaphragms are moved relative to the mould surface to bring the precursor into at least partial conformity with the mould surface before a vacuum is drawn between the diaphragms and the mould surface. The diaphragms are not brought into initial conformity with the mould surface through the action of a vacuum. The motion of the diaphragms under the action of a vacuum can be more difficult to predict than their motion when translated mechanically due to their tendency to stretch as a vacuum is drawn. That stretching can make it difficult to ensure desired positional registration between the precursor and the mould surface. Thus bringing the precursor into initial contact with the mould body through movement of the diaphragms other than under the action of a vacuum can improve the precision of the process.

In the process described above, the mould body is located under the lower diaphragm and the lower diaphragm is moved into contact with the mould body. This methodology may be varied in several ways. In one variant, the mould body could be moved upwards to contact the lower diaphragm and press the precursor into shape. In another variant, the mould body could be located above the upper diaphragm. Then, once the precursor has been loaded and optionally a vacuum has been drawn between the diaphragms, the precursor can be brought into conformity with the mould surface by moving the diaphragms upwards and/or moving the mould body downwards.

Locating the mould body above the diaphragms may have a number of advantages. First, it may facilitate conformity between the precursor and the mould surface because any natural sag of the diaphragms under gravity will tend to make them concave when viewed from above, and that curvature is in the same sense as that imposed by a mould tool impinging from above. Second, it permits a manufacturing architecture in which multiple mould tools are stored above the diaphragm forming station and can be moved into position as required to form different parts. The mould body or tool piece can be positioned using a robot arm that takes the piece from a tool magazine. The loading of the precursor can still be done at the level of an operator on the factory floor. This can save on factory space and make tool switching quicker. Third, with the mould tool located above the diaphragms there is more freedom to move the diaphragms laterally. In one convenient arrangement, at least the lower diaphragm is laterally moveable. The lower diaphragm may be mounted on a laterally moveable support, for example a wheeled trolley or a conveyor belt. Alternatively, the lower diaphragm may form part of a laterally movable strip of material or an endless loop. Precursor may be located on the diaphragm at a first location. Then the diaphragm may be moved laterally to a location under the mould tool. This may be done by the diaphragm's support moving across a factory floor. Alternatively, in the case where the diaphragm forms part of a strip or belt, the precursor may be loaded on the strip or belt at a first location, and then the strip or belt may be moved to bring the part carrying the precursor into position under the mould body. Then the process can proceed as described above. This approach can reduce the cycle time of the diaphragm forming equipment. The upper diaphragm may remain with the mould body or it may move laterally with the lower diaphragm.

Once the precursor has been set in shape as described above, it can be used in a subsequent forming process. For example, it can be located in a mould, impregnated with resin and the resin cured. The fibres of the precursor can then reinforce the resin. The subsequent forming process may be a resin transfer moulding process. The resin may be impregnated into the shaped precursor under a vacuum. In the case that the precursor is intended to go on to form a structural part of a vehicle (e.g. an automobile tub, an aircraft wing or a boat hull) or a part for another purpose such as a blade for a wind turbine, the structural part of the vehicle may be formed when the resin is impregnated into the shaped precursor. Advantageously, the structural part of a high performance automobile is formed when the resin is impregnated into the shaped precursor.

A single vacuum pump could be provided, and it could be connected by a valve to either outlet 117, 118.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of forming a fibre article, comprising:
providing a former having a contoured forming surface;
locating a fibre preform between a first diaphragm and a second diaphragm, the second diaphragm being offset from the forming surface;
drawing a vacuum between the first and second diaphragms so as to hold the preform captive between the diaphragms;
storing a plurality of formers in a storage zone located above the second diaphragm;
automatically moving a predetermined one of the said formers to an operative position over the second diaphragm;
mechanically displacing the diaphragms relative to the former so as to bring a part of the second diaphragm adjoining the preform into partial conformity with the former, during the said displacing step the former is located above the second diaphragm;
drawing a vacuum between the second diaphragm and the former so as to increase the conformity between the said part of the second diaphragm and the former; and
setting the preform in its configuration.

2. The method as claimed in claim 1, wherein at the said locating step the first diaphragm is offset from the forming surface.

3. The method as claimed in claim 1, wherein at least the second diaphragm is supported by a frame and the step of mechanically displacing the diaphragms comprises displacing the frame relative to the former.

4. The method as claimed in claim 1, wherein the step of displacing the diaphragms comprises moving the diaphragms upwards relative to the former.

5. The method as claimed in claim 1, wherein the second diaphragm overlies the first diaphragm.

6. The method as claimed in claim 1, comprising:
providing a mechanism for moving the first diaphragm laterally;
locating the fibre preform on the first diaphragm at a first station;
laterally moving the first diaphragm carrying the fibre preform to a second station; and
performing the said displacing step with the first diaphragm located at the second station.

7. The method as claimed in claim 1, wherein the preform comprises a heat-activatable binder and the method comprises:
when the preform is in contact with at least the first diaphragm applying heat to the preform; and
ceasing to apply heat to the preform prior to the said displacing step.

8. The method as claimed in claim 7, wherein the step of applying heat to the preform comprises positioning a first heater unit so as to be located between the former and the one of the first and second diaphragms closest to the former, and using the first heater unit to apply heat to the preform; and the step of ceasing to apply heat to the preform comprises removing the first heater unit from between the former and the one of the first and second diaphragm closest to the former.

9. The method as claimed in claim 1, comprising:
tensioning the first diaphragm; and
locating the fibre preform on the first diaphragm whilst the first diaphragm is under tension.

10. The method as claimed in claim 9, wherein the first diaphragm is maintained under tension until the vacuum has been drawn between the first and second diaphragms.

11. The method as claimed in claim 9, wherein the step of tensioning the first diaphragm comprises pressing an object into the first diaphragm.

12. The method as claimed in claim 1, wherein the fibre preform comprises multiple sheets of fibre material laminated into a stack.

13. The method as claimed in claim 12, wherein the or each sheet of fibre material is a sheet of woven fibre material.

14. The method as claimed in claim 1, wherein the diaphragms are elastic.

15. The method as claimed in claim 1, wherein the preform is part of a structural part of a vehicle.

16. The method as claimed in claim 15, wherein the preform is part of a structural part of an automobile and the structural part is an automobile tub.

17. A method of forming a fibre article, comprising:
providing a former having a contoured forming surface;
locating a fibre preform between a first diaphragm and a second diaphragm, the second diaphragm being offset from the forming surface, the preform comprising a heat-activatable binder;
when the preform is in contact with at least the first diaphragm applying heat to the preform by positioning a first heater unit so as to be located between the former and the one of the first and second diaphragms closest to the former and using the first heater unit to apply heat to the preform;
drawing a vacuum between the first and second diaphragms so as to hold the preform captive between the diaphragms;

mechanically displacing the diaphragms relative to the former so as to bring a part of the second diaphragm adjoining the preform into partial conformity with the former;

ceasing to apply heat to the preform prior to the said displacing step by removing the first heater unit from between the former and the one of the first and second diaphragm closest to the former;

drawing a vacuum between the second diaphragm and the former so as to increase the conformity between the said part of the second diaphragm and the former; and setting the preform in its configuration.

18. A system comprising:

a fibre preform; and a double diaphragm forming apparatus comprising:
  a plurality of formers in a storage zone, each former having a contoured forming surface;
  a first diaphragm and a second diaphragm, the second diaphragm being offset from the forming surface, the plurality of formers being moveable into an operative position located above the second diaphragm, the storage zone being located above the second diaphragm, and the fibre preform being disposed between the first and second diaphragms;
  a vacuum pump for drawing a vacuum between the first and second diaphragms so as to hold the fibre preform captive between the first and second diaphragms;
  a drive mechanism for mechanically displacing the first and second diaphragms relative to the former so as to bring a part of the second diaphragm adjoining the fibre preform into partial conformity with the former; and
  a second vacuum pump for drawing a vacuum between the second diaphragm and the former so as to increase the conformity between the said part of the second diaphragm and the former.

* * * * *